US012798693B2

(12) United States Patent
Hyvönen

(10) Patent No.: US 12,798,693 B2
(45) Date of Patent: Nov. 17, 2026

(54) DAMPING SYSTEM FOR A CABIN OF A MOVABLE WORK MACHINE

(71) Applicant: Ponsse Oyj, Vieremä (FI)

(72) Inventor: Jukka Hyvönen, Vieremä (FI)

(73) Assignee: Ponsse Oyj, Vieremä (FI)

( * ) Notice: Subject to any disclaimer, the term of this patent is extended or adjusted under 35 U.S.C. 154(b) by 307 days.

(21) Appl. No.: 18/558,764

(22) PCT Filed: May 4, 2022

(86) PCT No.: PCT/FI2022/050294

§ 371 (c)(1),
(2) Date: Nov. 3, 2023

(87) PCT Pub. No.: WO2022/234190

PCT Pub. Date: Nov. 10, 2022

(65) Prior Publication Data

US 2025/0074516 A1 Mar. 6, 2025

(30) Foreign Application Priority Data

May 4, 2021 (FI) ..................................... 20215518

(51) Int. Cl.
*B62D 33/06* (2006.01)
*B60R 21/13* (2006.01)

(52) U.S. Cl.
CPC .......... *B62D 33/0604* (2013.01); *B60R 21/13* (2013.01); *B62D 33/0617* (2013.01)

(58) Field of Classification Search
CPC ............................ B60R 21/13; B62D 23/0617
See application file for complete search history.

(56) References Cited

U.S. PATENT DOCUMENTS 3,638,749 A 2/1972 Stanford et al.
4,735,272 A 4/1988 Sjoestroem et al.
(Continued)

FOREIGN PATENT DOCUMENTS

EP 3059104 A1 * 8/2016 ............. F16F 9/512
EP 3766765 A1 1/2021
(Continued)

OTHER PUBLICATIONS

PCT Application No. PCT/FI2022/050294 International Search Report dated Aug. 29, 2022.
(Continued)

*Primary Examiner* — Taras P Bemko
(74) *Attorney, Agent, or Firm* — Lathrop GPM LLP; Alex Shtraym

(57) ABSTRACT

The invention relates to a damping system for a cabin of a movable work machine, wherein the cabin is supported to the frame of the work machine with suspension elements, the suspension elements forming a ROPS resistant structure and including: a first stopper for fastening the cabin to the first end of the suspension element, a second stopper for fastening the frame to the second end of the suspension element, a guide element comprising a slide guide and a support arm, the slide guide and the support arm being arranged to move relative to each other, and the guide element having opposite ends, one of which is in the slide guide and the other is in the support arm, and one opposite end is mechanically bound to the first end and the other is mechanically bound to the second end, a spring element, and a damping element.

20 Claims, 11 Drawing Sheets

(56) References Cited

U.S. PATENT DOCUMENTS

| | | | | |
|---|---|---|---|---|
| 5,964,310 | A | 10/1999 | Gyllner | |
| 8,702,154 | B1 * | 4/2014 | Gielda | B60R 21/13 280/756 |
| 2002/0113463 | A1 | 8/2002 | Gross et al. | |
| 2006/0226680 | A1 * | 10/2006 | Matsumoto | E02F 9/163 296/190.01 |
| 2014/0265075 | A1 * | 9/2014 | Gottschalk | F16F 15/08 267/141 |
| 2014/0319876 | A1 | 10/2014 | Schauer et al. | |
| 2015/0123390 | A1 * | 5/2015 | Scott | B60R 21/131 280/756 |
| 2015/0217619 | A1 | 8/2015 | Benevelli et al. | |
| 2016/0096553 | A1 * | 4/2016 | Valerio | E02F 9/166 248/638 |
| 2021/0094513 | A1 * | 4/2021 | Yamamoto | B60S 1/0433 |
| 2021/0402943 | A1 * | 12/2021 | Shoen | B62D 25/168 |

FOREIGN PATENT DOCUMENTS

| | | | |
|---|---|---|---|
| JP | H10102540 | A | 4/1998 |
| WO | 2019110095 | A1 | 6/2019 |

OTHER PUBLICATIONS

CN Application No. 202280032819.9, Office Action dated Jan. 26, 2026.

CN Application No. 202280032819.9, Office Action dated Jul. 25, 2026.

* cited by examiner

DAMPING SYSTEM FOR A CABIN OF A MOVABLE WORK MACHINE

CROSS-REFERENCE TO RELATED APPLICATIONS

This application claims benefit of PCT/FI2022/050294 filed May 4, 2022, which claims benefit of Finnish Patent Application No. FI 20215518 filed May 4, 2021, each of which is incorporated by reference in its entirety.

FIELD OF THE INVENTION

The invention is related to a damping system for a cabin of a movable work machine, wherein the cabin is supported to the frame of the work machine with suspension elements for damping oscillation motion, impacts and vibration, the suspension elements having a first end and a second end and forming a Roll Over Protection System ("ROPS") resistant structure, and the suspension elements including a first fixing stopper for fastening the cabin of the work machine to the first end of the suspension element, a second fixing stopper for fastening the frame of the work machine to the second end of the suspension element, a guide element comprising a slide guide and a support arm fitted in the slide guide, the slide guide and the support arm being arranged to move relative to each other, and the guide element having opposite ends, of which opposite ends one is in the slide guide and the other is in the support arm, and of which opposite ends one is mechanically bound to the first end of the suspension element and the other is mechanically bound to the second end of the suspension element, a spring element, which is mechanically bound between the first end of the suspension element and the second end of the suspension element, a damping element, which is mechanically bound between the first end of the suspension element and the second end of the suspension element.

BACKGROUND OF THE INVENTION

A movable work machine is often used on an uneven terrain, where the relief of surface causes oscillation, impacts and vibration to the work machine. If the cabin of the work machine is supported to the frame of the work machine fixedly or with simple rubber bushings, work machine oscillation, impacts and vibration are transmitted to the body of the driver in the cabin, which can hinder the control of the work machine. In addition, vibration produced by the motor of the work machine, for example, can be transmitted to the driver via a fixed cabin making their work difficult. Oscillation and vibration can also cause health problems to the driver who works in the cabin of a work machine. Hence, it is justified to fit a damping system in the cabin of a work machine for damping the cabin's oscillations.

It is known that a cabin of a movable work machine can be fitted with a damping system, wherein the cabin is supported to the frame of the work machine with suspension elements for damping the oscillation movement. For example, patent publication EP 3 059 104 A1 representing prior art proposes a damping system comprising elastic suspension elements fitted in each corner of the cabin. The suspension element proposed in the publication comprises a cabin fastener, which is fastened to a support arm. The support arm is fixedly fitted to the other end of a slide guide fitted in the frame. At the end of the support arm, inside the slide guide, there is a piston that moves according to the suspension travel having liquid chambers on both of its sides.

Prior art damping systems for a cabin of a movable work machine are also known, which comprise a coil spring and a damping element placed inside the coil spring for resisting the vibration of the coil spring.

Specific safety requirements exist for protective structures that protect the driver of movable work machines. For example, the safety cabin of a work machine must pass a ROPS test, which confirms that the structures will resist loads that generate during a work machine overturn. Hence, for example, the cabin suspension of a work machine that weighs 32,000 kg must resist a very high lateral force. A problem with prior art damping systems is that they resist lateral loads poorly in the case of overturning. In addition, the space available for a damping system is usually reduced, which means that the suspension travel of the damping system remains short.

SUMMARY OF THE INVENTION

The object of the invention is to provide an improved damping system for a cabin of a movable work machine, which resists lateral loads better and enables a longer suspension travel. The characteristic features of this invention are set forth in the accompanying claim 1. This solution avoids a heavy and bulky auxiliary frame. This enables a more advantageous construction and space below the cabin for components or, alternatively, a smaller total height is achieved.

In the solution according to the invention, in the damping system for a cabin of a movable work machine, the cabin is supported to the frame of the work machine with suspension elements for damping oscillation motion, impacts and vibration, the suspension elements having a first end and a second end and forming a ROPS resistant structure and the suspension elements including a first fixing stopper for fastening the cabin of the work machine to the first end of the suspension element, a second fixing stopper for fastening the frame of the work machine to the second end of the suspension element, a guide element comprising a slide guide and a support arm fitted in the slide guide, the slide guide and the support arm being arranged to move relative to each other, and the guide element having opposite ends, of which opposite ends one is in the slide guide and the other is in the support arm, and of which opposite ends one is mechanically bound to the first end of the suspension element and the other is mechanically bound to the second end of the suspension element, a spring element, which is mechanically bound between the first end of the suspension element and the second end of the suspension element, a damping element, which is mechanically bound between the first end of the suspension element and the second end of the suspension element. The travel range of the support arm is arranged to extend at least beyond the first fixing stopper or the second fixing stopper, and the guide element is fitted outside the spring element and the damping element.

In other words, in the suspension element according to the invention, the travel range of the support arm is arranged to extend at least beyond one of the fixing stoppers, i.e., through the point of support of the frame or the cabin so that a box space is arranged for the through-going support arm. In this way, the suspension elements for the cabin damping system can be made extremely resistant to lateral loads and the suspension travel can be increased without increasing the distance between the frame and the cabin. With the suspension element according to the invention, it is thus possible to achieve a ROPS resistant damping system, where the suspension travel of the cabin relative to the frame is clearly longer than heretofore.

By fitting the spring element and the damping element abreast of the guide element, the distance between the first fixing stopper and the second fixing stopper can be made longer so that the suspension travel of the spring element and the damping element can be made longer without increasing the total length of the suspension element. This also simplifies the structure of the guide element. A commercial product can be used as the spring element and the damping element. Replacement of the spring element and the damping element during maintenance is easy, since it is not necessary to detach the cabin from the suspension element. In this case, it is also possible to make the slide guide and the support arm sufficiently large, when a coaxial coil spring is not fitted around the slide guide, achieving thereby excellent structural resistance to lateral loads even in the case of defective lubrication of the construction.

A spring element can here mean a coil spring, which can be made of steel, for example. The spring element can also comprise a hydraulic or pneumatic spring, which can consist of, for example, a hydraulic or pneumatic cylinder, which is connected to a hydraulic or pneumatic pressure accumulator. The suspension element can be a passive or an active element. In a passive suspension element, the spring element and the damping element can be mechanical, hydraulic or pneumatic components without active control. Instead, an active suspension element mechanically corresponds to a passive suspension element, but it additionally comprises a computer-controlled hydraulic cylinder, where the flow of a hydraulic fluid can be controlled based on, for example, measurement data from sensors that detect movements of the work machine, reacting to changes of the terrain. Active control can also be used, among other things, to adjust the cabin height and damping properties. The damping element and the spring element located at the side of the guide element also enable easy switching of the suspension element from passive to active and vice versa.

Advantageously, the slide guide of the guide element is open at both of its ends enabling passing of support arm through the slide guide. In other words, the support arm can be arranged to move throughout the entire length of the slide guide. In this way, the distance between the points of support of the slide guide can be made longer than prior art so that the travel range for damping increases and a better resistance to lateral loads is achieved for the suspension element.

Advantageously, the support arm has a first end and a second end, which are always outside said slide guide in the movement direction. In this way, the resistance to lateral loads of the suspension element is extremely good in all situations.

Advantageously, there is a first stopper at the first end of the support arm and a second stopper at the second end for limiting the movement of the support arm. Hence, the stoppers stop the movement of the support arm in extreme positions thus reducing the load applied to the spring element and the damping element.

Advantageously, the slide guide is mechanically bound to the frame of the work machine and the support arm is mechanically bound to the cabin of the work machine. In this way, the construction can be made mechanically resistant.

The slide guide can also be mechanically bound to the cabin of the work machine and the support arm can be mechanically bound to the frame of the work machine.

Advantageously, the ROPS resistance of the work machine has been achieved with structural strength of the slide guide and the support arm of the suspension element. In this way, a simple, resistant, easily maintainable and stable construction is achieved for the suspension element, essentially without lateral clearance.

To achieve ROPS resistance for the cabin of the work machine, the support arm can be made of metal, preferably steel, and the diameter of the support arm with a circular cross-section can be in the range of 50-100 mm, preferably 60-80 mm. In this way, the support arm can be made to resist well to lateral loads.

For providing ROPS resistance for the cabin of the work machine, the slide guide can be made of metal, preferably steel, and the difference between the inner diameter and the outer diameter of the cylindrical slide guide can be in the range of 20-50 mm, preferably 25-40 mm, and the distance between the points of support at both ends of the slide guide can be in the range of 150-300 mm, preferably 200-250 mm. In this way, the slide guide can be made to resist well to lateral loads.

The outer diameter of the slide guide can be in the range of 80-150 mm, preferably 90-130 mm. Naturally, the inner diameter of the slide guide is slightly larger than the diameter of the support arm.

Advantageously, the support arm is essentially parallel to the line segment determined by the centre point of the first fixing stopper and the centre point of the second fixing stopper, and the centre point of the support arm is essentially on the line segment determined by the centre point of the first fixing stopper and the centre point of the second fixing stopper. In this way, the suspension element can be made structurally extremely resistant.

Advantageously, there is an empty space in the frame or in the cabin at the suspension element for the movement of the support arm of the guide element. In this way, the support arm going through the slide guide can move over a longer range, thus enabling maximisation of the support arm length, which increases the resistance to lateral loads of the suspension element.

The damping system can have at least two suspension elements. Thus, damping of cabin oscillations can be implemented with a small number of components.

Advantageously, the damping system comprises at least four suspension elements in such a way that there is at least one suspension element in each corner of the cabin. In this way, the cabin can be fastened to the frame in a stable manner.

Advantageously, the distance between the first fastening end and the second fastening end of the damping element is longer than the distance between the points of support of the slide guide. In this way, the damping range of the damping system can be made longer.

The distance between the first fastening end and the second fastening end of the damping element can be in the range of 110-200%, preferably 120-170%, of the distance between the points of support of the slide guide. In this way, cabin damping can be made as good as possible without increasing the length of the entire suspension element.

Advantageously, there is an elastic component between the cabin and the first fixing stopper of the suspension element for compensating distance changes of the first fixing stoppers due to support arm movements. When the first fixing stoppers of the suspension elements move independently of each other, mutual distances between the first fixing stoppers can vary. This variation can be compensated for with an elastic component between the cabin and the first fixing stopper.

Advantageously, within the guide element, fitted around the support arm, there is a piston that limits a first chamber and a second chamber within the guide element. In this way, the damping system can comprise stability control, for example, and this enables hydraulic cabin height adjustment. The piston can also be used for damping. Damping can be adjusted by modifying the pressures of fluids in the first chamber and in the second chamber. The driver of the work machine can adjust damping from the cabin, for example.

Advantageously, two suspension elements are cross-connected in such a way that a first hydraulic pipe connects the first chamber of the first suspension element and the second chamber of the second suspension element, and a second hydraulic pipe connects the second chamber of the first suspension element and the first chamber of the second suspension element, for forming hydraulic stability control. In this way, it is possible to reduce cabin tilting when moving on an uneven terrain.

Advantageously, the movable work machine is a forestry machine. Forestry machines are often used in an uneven surface; therefore, a cabin damping system is necessary.

The spring element can comprise a coil spring, which is fitted coaxially around the damping element. Thus, the spring element can be made mechanically simple.

The spring element can comprise a hydraulic or pneumatic pressure accumulator. Thus, the spring element can be made adjustable.

The vertical travel range of the suspension element can be adjusted to 100-200 mm, preferably 130-180 mm. Hence, movements of the work machine cabin can be efficiently damped.

BRIEF DESCRIPTION OF THE DRAWINGS

The invention is described below in detail with reference to the accompanying drawings that illustrate some of the embodiments of the invention, in which.

DETAILED DESCRIPTION OF THE DRAWINGS

Figure 1:
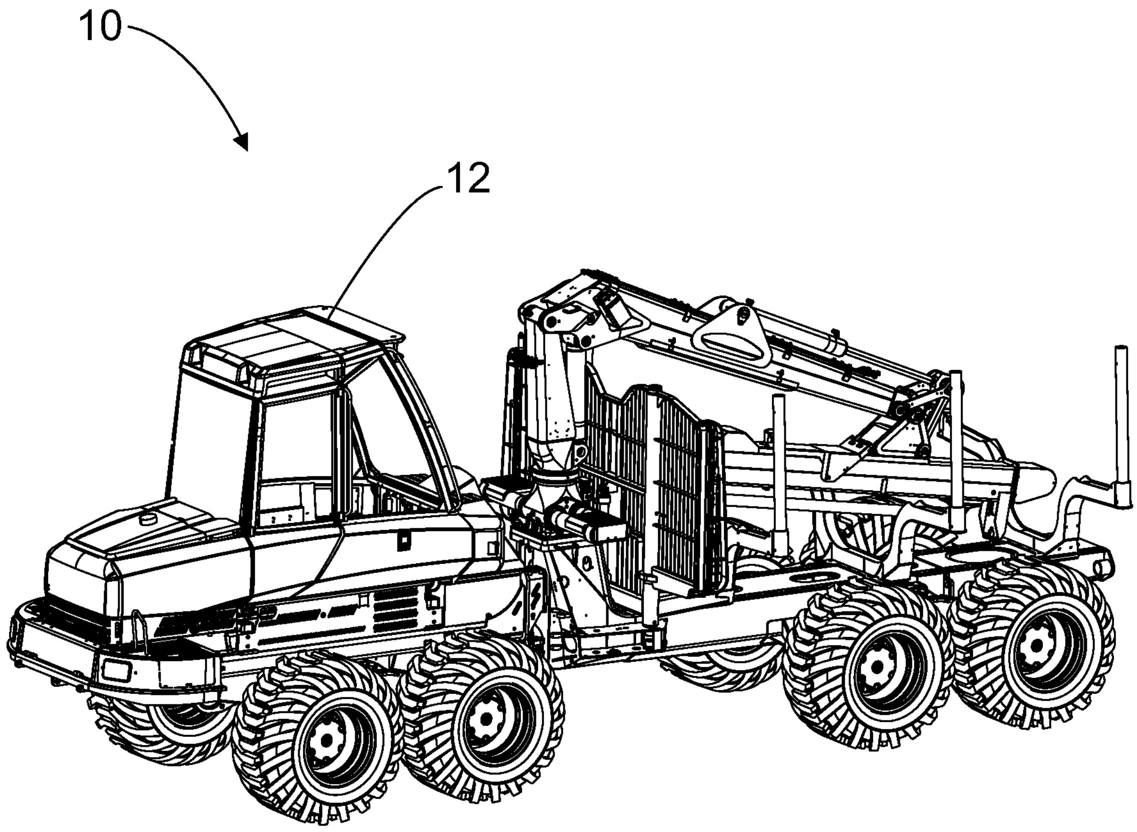
FIG. 1 depicts a movable work machine object of the invention.

FIG. 1 illustrates a movable work machine 10 object of the invention, which in this case is a forestry machine. A forestry machine can be a harvester, a forwarder or a combined machine. A movable work machine 10 comprises a damping system according to the invention for a cabin 12, wherein the cabin 12 is supported to the frame 14 of the work machine 10 with suspension elements 20 for damping oscillation motion.

Figure 2:
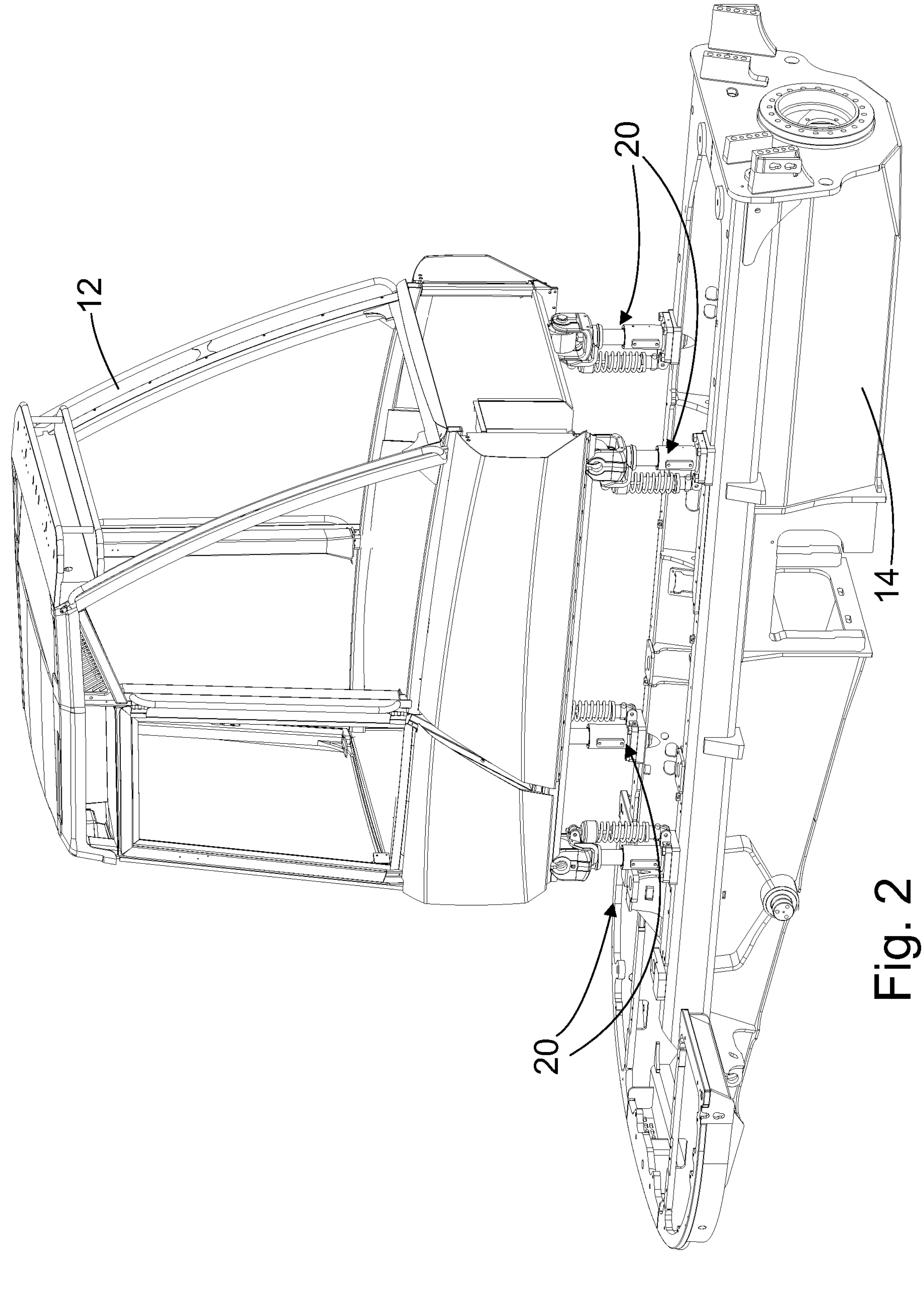
FIG. 2 depicts a damping system according to the invention fitted between the cabin and the frame of a work machine.
Figure 3:
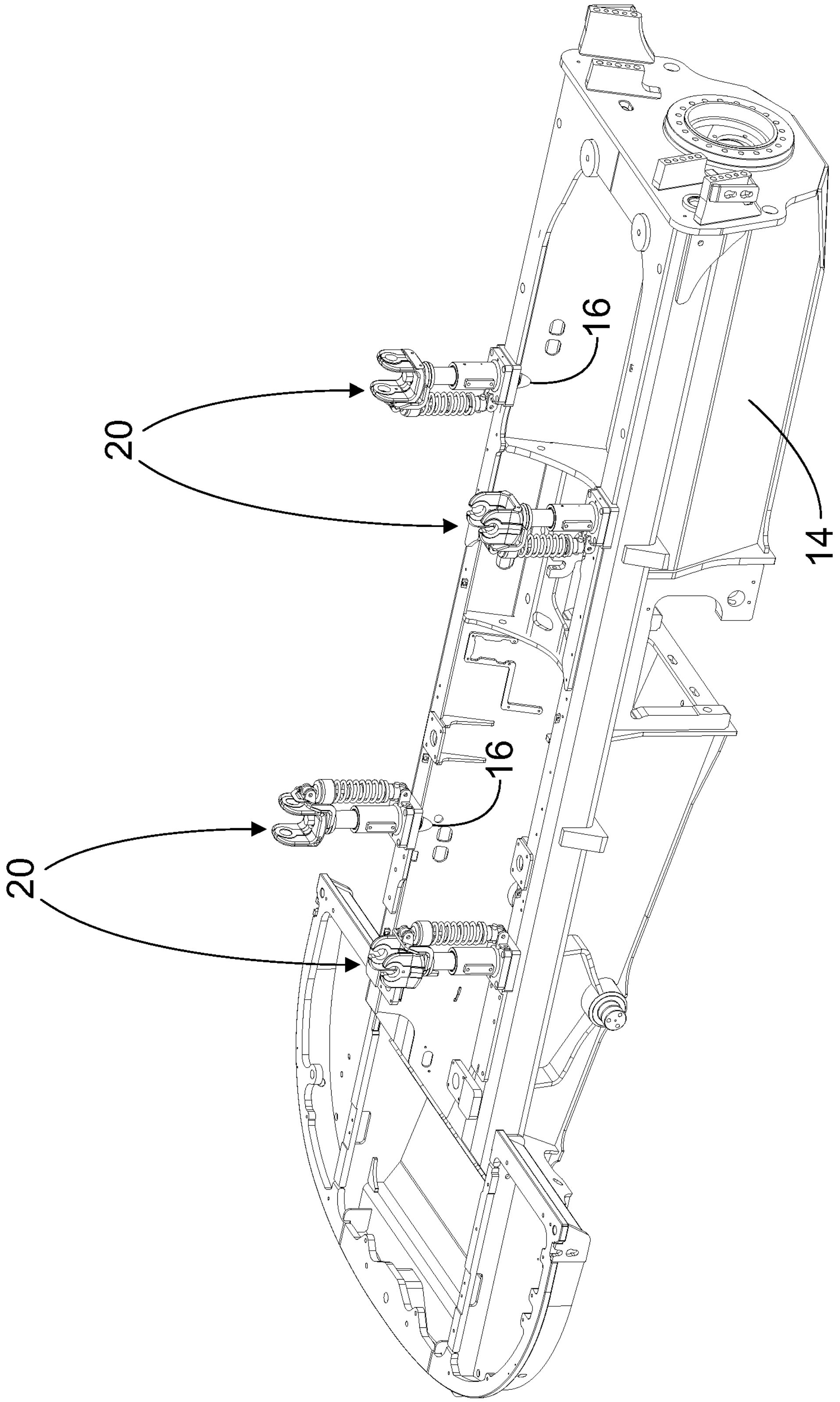
FIG. 3 depicts a frame of a work machine, wherein a damping system according to the invention has been fitted.

FIG. 2 illustrates a separated cabin 12 and a frame 14 of a work machine 10. FIG. 3 illustrates a separated frame 14 of a work machine 10 and suspension elements 20 connected thereto for a damping system of a cabin 12. The cabin 12 is connected to the frame 14 with four suspension elements 20, which are located in each corner of the cabin 12. In the frame 14, below the suspension elements 20, there is an empty space 16 for the movement of a support arm 34 placed in the suspension element 20.

Figure 4:
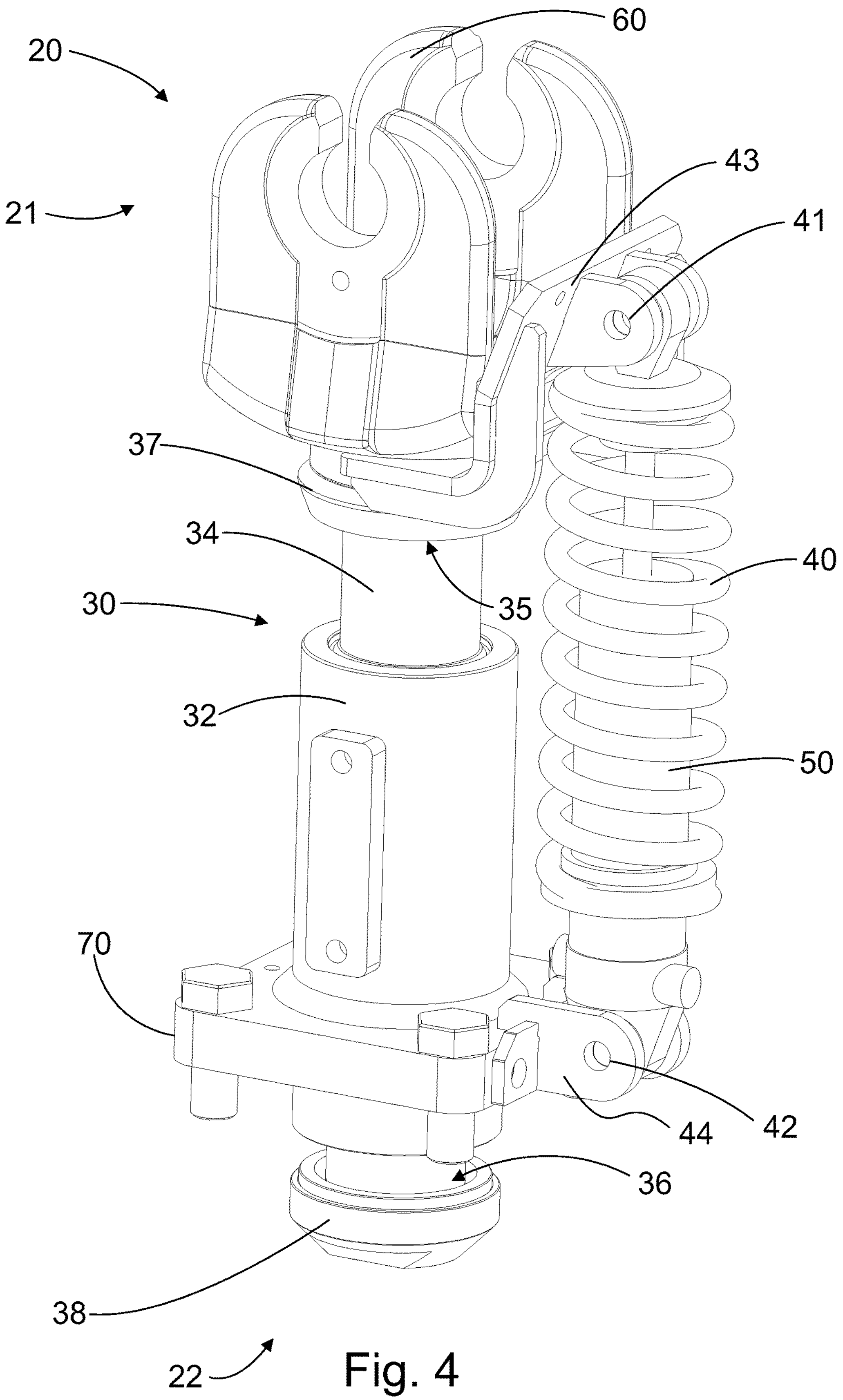
FIG. 4 is a perspective view of a first embodiment of a suspension element according to the invention.
Figure 5:
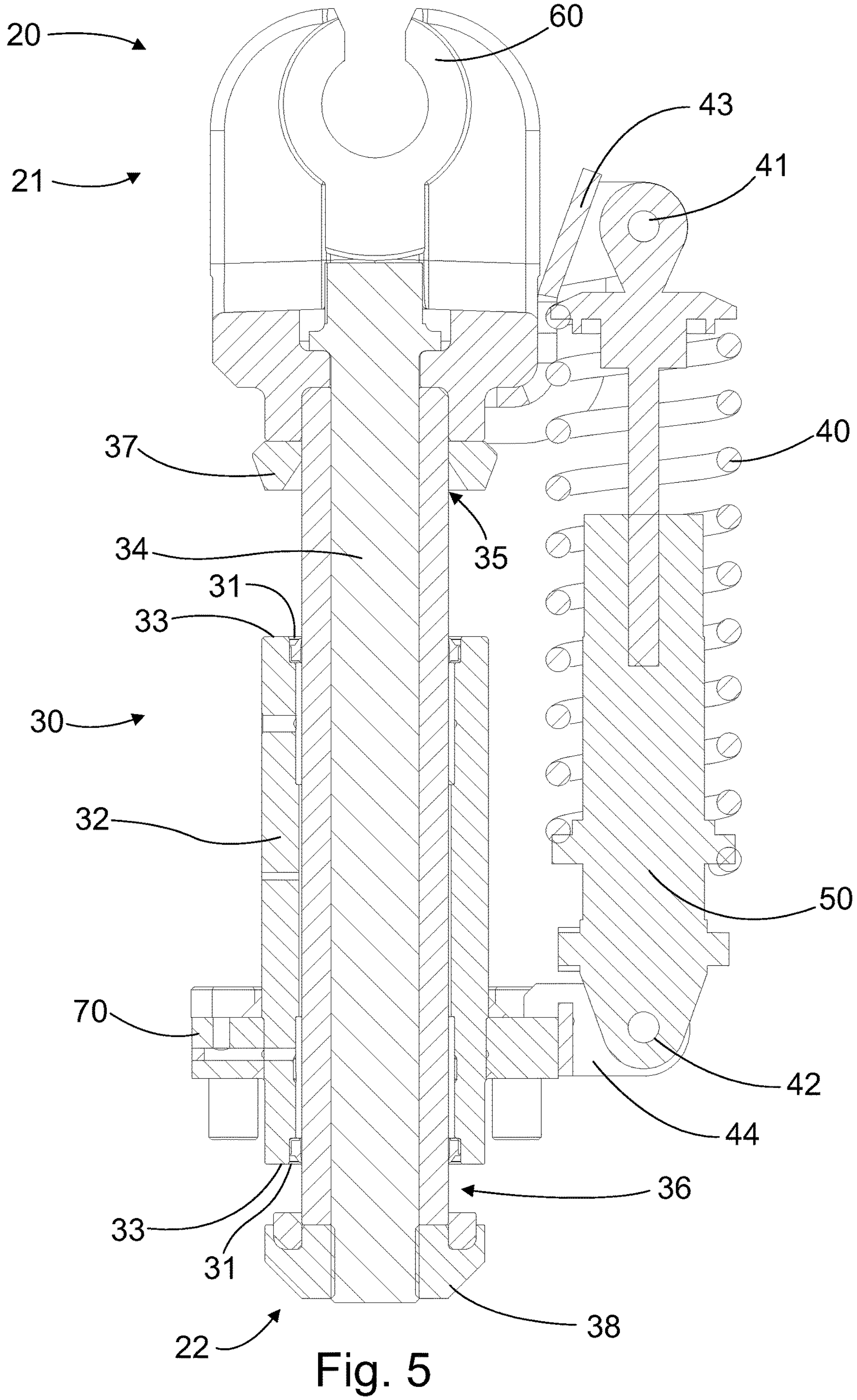
FIG. 5 is a cross-sectional view of a first embodiment of a suspension element according to the invention.

FIG. 4 illustrates a suspension element 20 according to the invention for a damping system of a cabin 12 of a work machine 10. FIG. 5 is a cross-sectional view of the suspension element 20 of FIG. 4. The suspension element 20 includes a guide element 30, which comprises a slide guide 32 and a support arm 34 fitted in the slide guide 32. In this embodiment, at the first end 21 of the suspension element 20 and at the first end 35 of the support arm 34, the latter being the end that is higher relative to the second end 36 of the support arm 34 in the operating position, there is a first fixing stopper 60, via which the cabin 12 is fastened to the suspension element 20. The slide guide 32 is fixedly fastened to the frame 14 of the work machine 10 via a second fixing stopper 70 of the suspension element 20. The second fixing stopper 70 is a flange-like fastener, with which the second end 22 of the suspension element 20 is fastened to the frame 14 of the work machine 10 using screws. In other words, the slide guide 32 is immobile relative to the second fixing stopper 70 and thus to the frame 14 of the work machine 10. The travel range of the support arm 34 is arranged to extend beyond the second fixing stopper 70. The slide guide 32 is open at both of its ends enabling the movement of the support arm 34 through the slide guide 32.

The cabin 12 and the support arm 34 connected thereto can thus move relative to the frame 14 and the slide guide 32. For damping this movement, the suspension element 20 comprises a spring element 40 and a damping element 50. In the suspension element 20 according to the invention, the spring element 40 and the damping element 50 are fitted at the side of the guide element 30. In this embodiment, the spring element 40 comprises a coil spring, which is fitted coaxially around the damping element 50. The spring element 40 and the damping element 50 are mechanically bound between the first fixing end 41 and the second fixing end 42. In this embodiment, the first fixing end 41 is mechanically connected to the first end 35 of the support arm 34 that moves relative to the frame 14 with a first fastening element 43 and the second fixing end 42 is mechanically connected to the slide guide 32 that is fixed relative to the frame 14 with a second fastening element 44. As the first fastening element 43, a separate fastener can be used, like in this embodiment, or alternatively, the cabin 12 of the work machine 10 can function as the first fastening element 43. As the second fastening element 44, a separate fastener can be used, like in this embodiment, or alternatively, the frame 14 of the work machine 10 can function as the second fastening element 44. In this embodiment, when the distance between the first fixing stopper 60 and the second fixing stopper 70 changes, the distance between the first fixing end 41 and the second fixing end 42 changes proportionately.

In this embodiment, to restrict the movement of the support arm 34, there is a first stopper 37 at the first end 35 of the support arm 34 and a second stopper 38 at the second end 36, located outside the points of support 33 of the slide guide 32. The first end 35 and the second end 36 of the support arm 34 are thus always outside the slide guide 32 in the movement direction. At both ends of the slide guide 32, there are slide bearings 31, which form the points of support 33.

Figure 6:
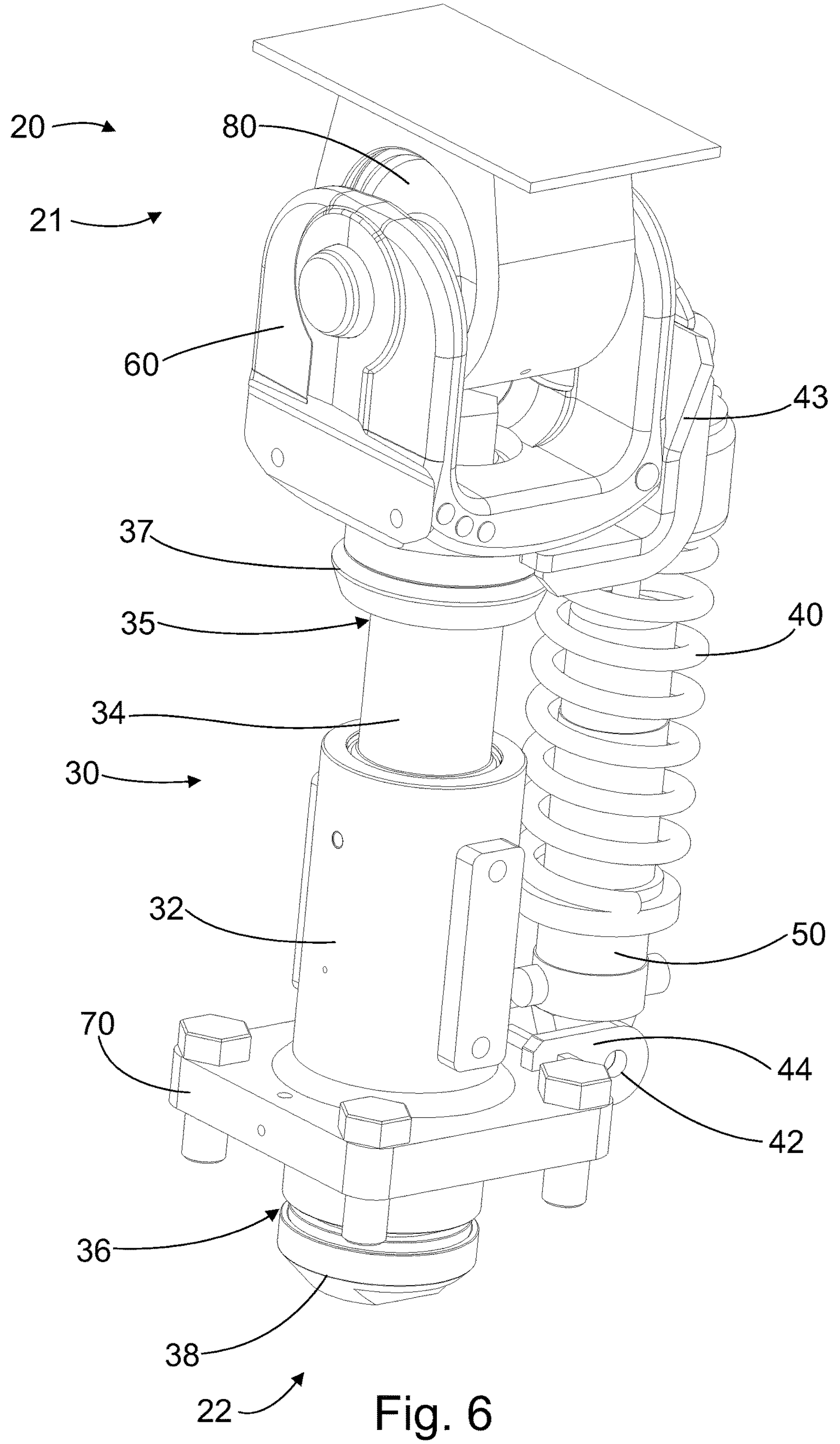
FIG. 6 is a perspective view of a first embodiment of a suspension element according to the invention, wherein an elastic component has been fastened to its first fixing stopper.
Figure 7:
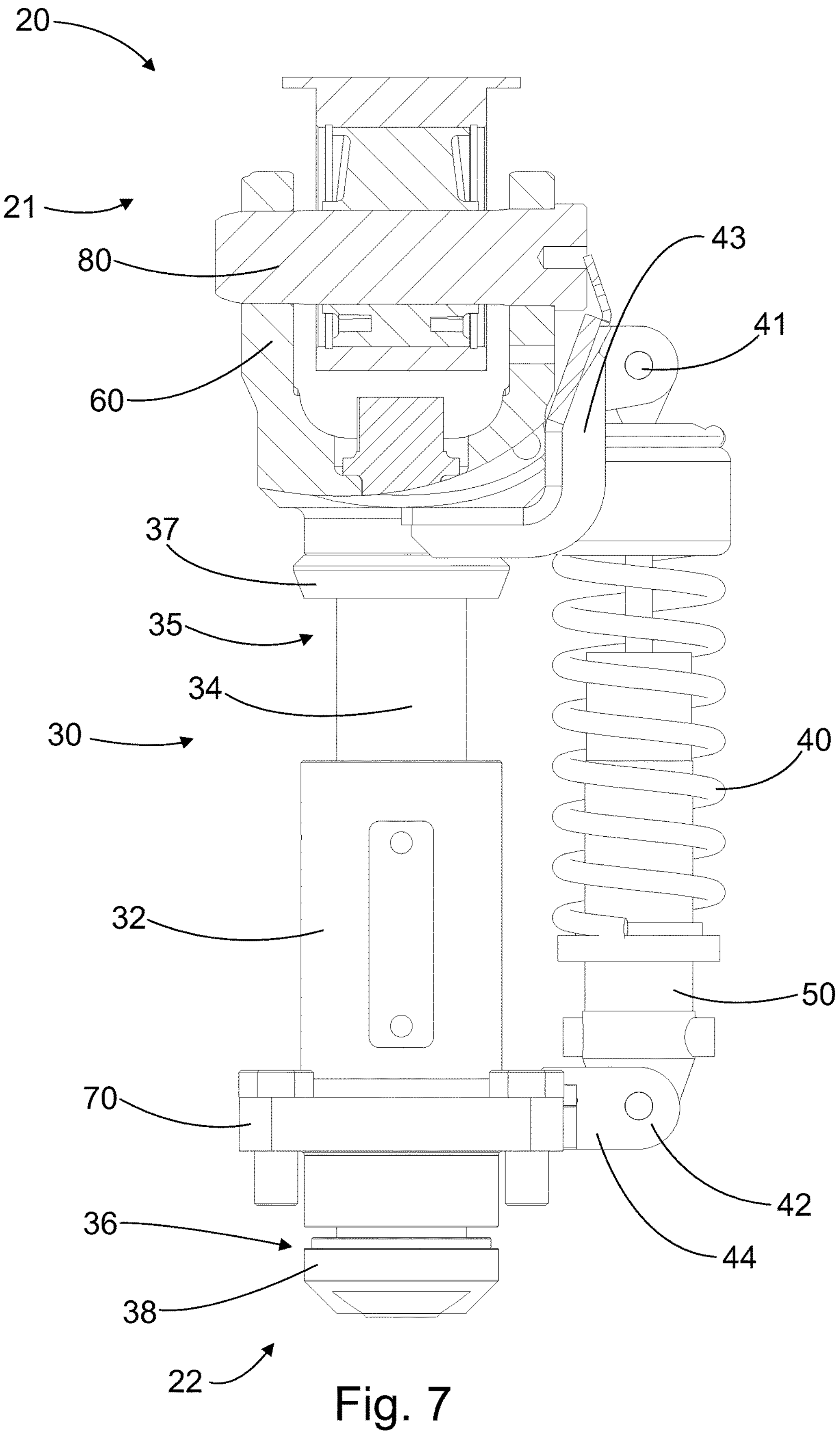
FIG. 7 is a partial cross-sectional view of a first embodiment of a suspension element according to the invention, wherein an elastic component has been fastened to its first fixing stopper.

In FIGS. 6 and 7, an elastic component 80 is fitted in the first fixing stopper 60 of the suspension element 20. The support arms 34 of the suspension elements 20 move independently of each other, which leads to variation of mutual distances of the first fixing stoppers 60 of different suspension elements 20. An elastic component 80 is advantageously used between the fastening of the cabin 12 and the suspension element 20 to compensate for distance changes of the first fixing stoppers 60 due to movements of the support arms 34. The elastic component 80 can be made of rubber, for example. Here, the elastic component 80 is a rubber bushing.

Figure 8:
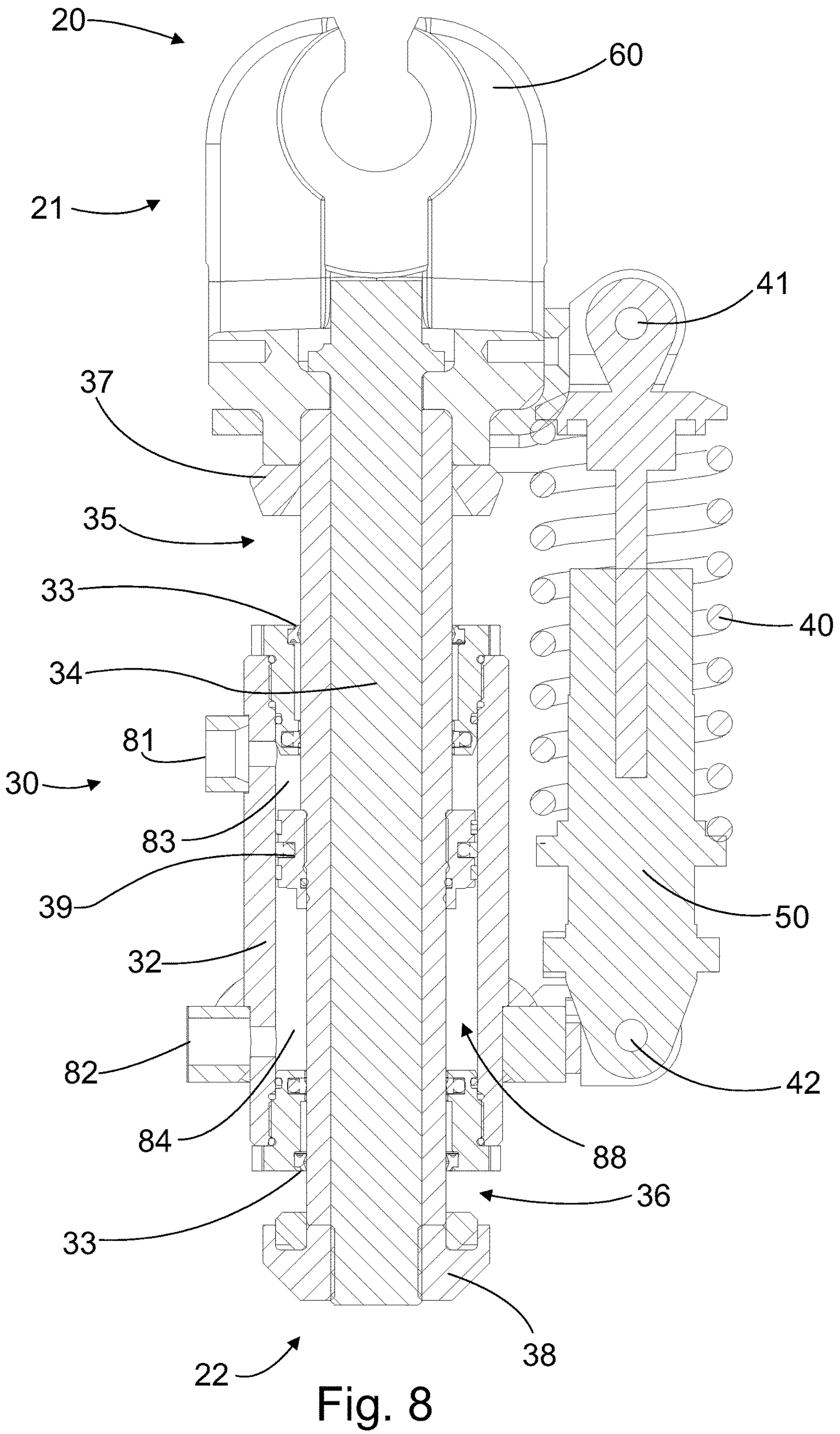
FIG. 8 is a cross-sectional view of a second embodiment of a suspension element according to the invention.

FIG. 8 illustrates another embodiment of the suspension element 20 according to the invention for a damping system of a cabin 12 of a work machine 10. This embodiment corresponds mainly to the embodiment illustrated in FIGS. 4 and 5, but the guide element 30 additionally comprises a hydraulic cylinder 88. The piston 39 of the hydraulic cylinder 88 is fitted inside the guide element 30, around the support arm 34. The piston 39 limits a first chamber 83 and a second chamber 84 within the guide element 30; the chambers can be filled with a hydraulic fluid. The guide element 30 also comprises a first hydraulic connection 81 connected to the first chamber 83 and a second hydraulic connection 82 connected to the second chamber 84. This embodiment enables, among other things, cabin height adjustment and stability control.

Figure 9:
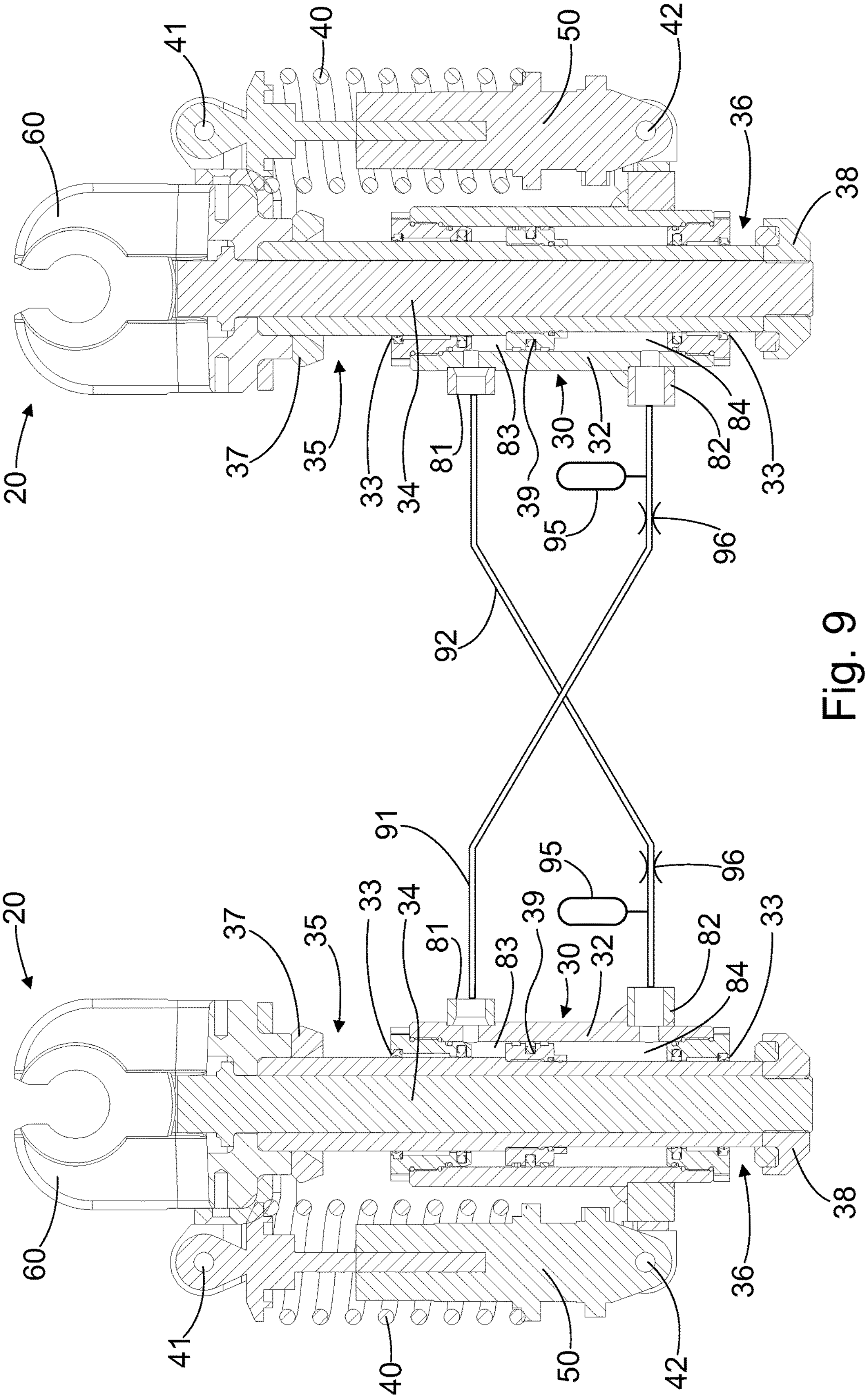
FIG. 9 is a basic view of the implementation of a stabiliser in a second embodiment of a suspension element according to the invention.

FIG. 9 illustrates the operating principle of the hydraulic stabiliser included in the suspension element 20. The operation of the stabiliser is based on the cross-connection of the two suspension elements 20 of the embodiment illustrated in FIG. 8. Two suspension elements 20 are cross-connected in such a way that a first hydraulic pipe 91 connects a first chamber 83 of the first suspension element 20 and a second chamber 84 of the second suspension element 20. Correspondingly, a second hydraulic pipe 92 connects a second chamber 84 of the first suspension element 20 and a first chamber 83 of the second suspension element 20. The first hydraulic pipe 91 and the second hydraulic pipe 92 are additionally provided with a pressure accumulator 95 and a throttle 96.

Figure 10:
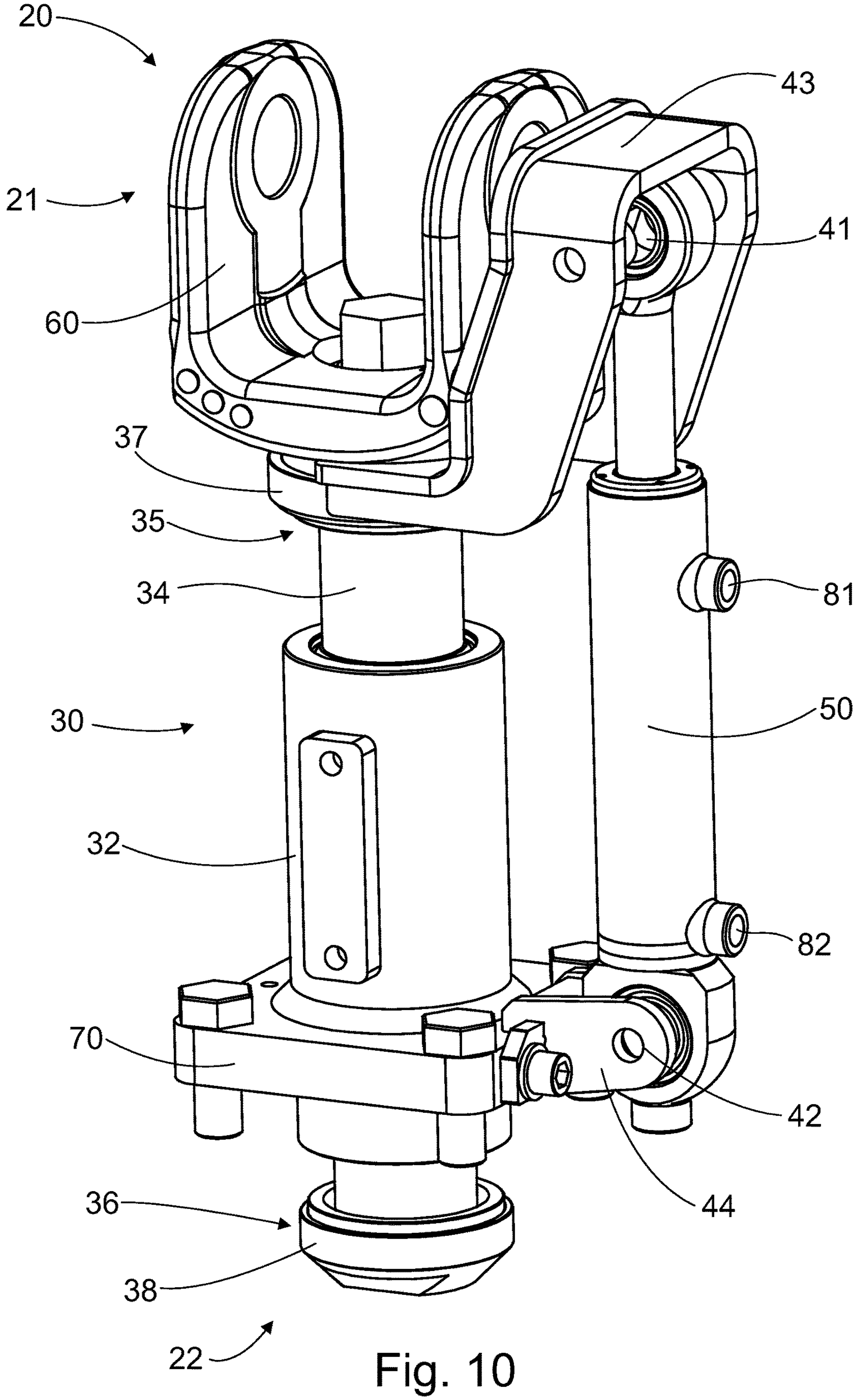
FIG. 10 is a perspective view of a third embodiment of a suspension element according to the invention.
Figure 11:
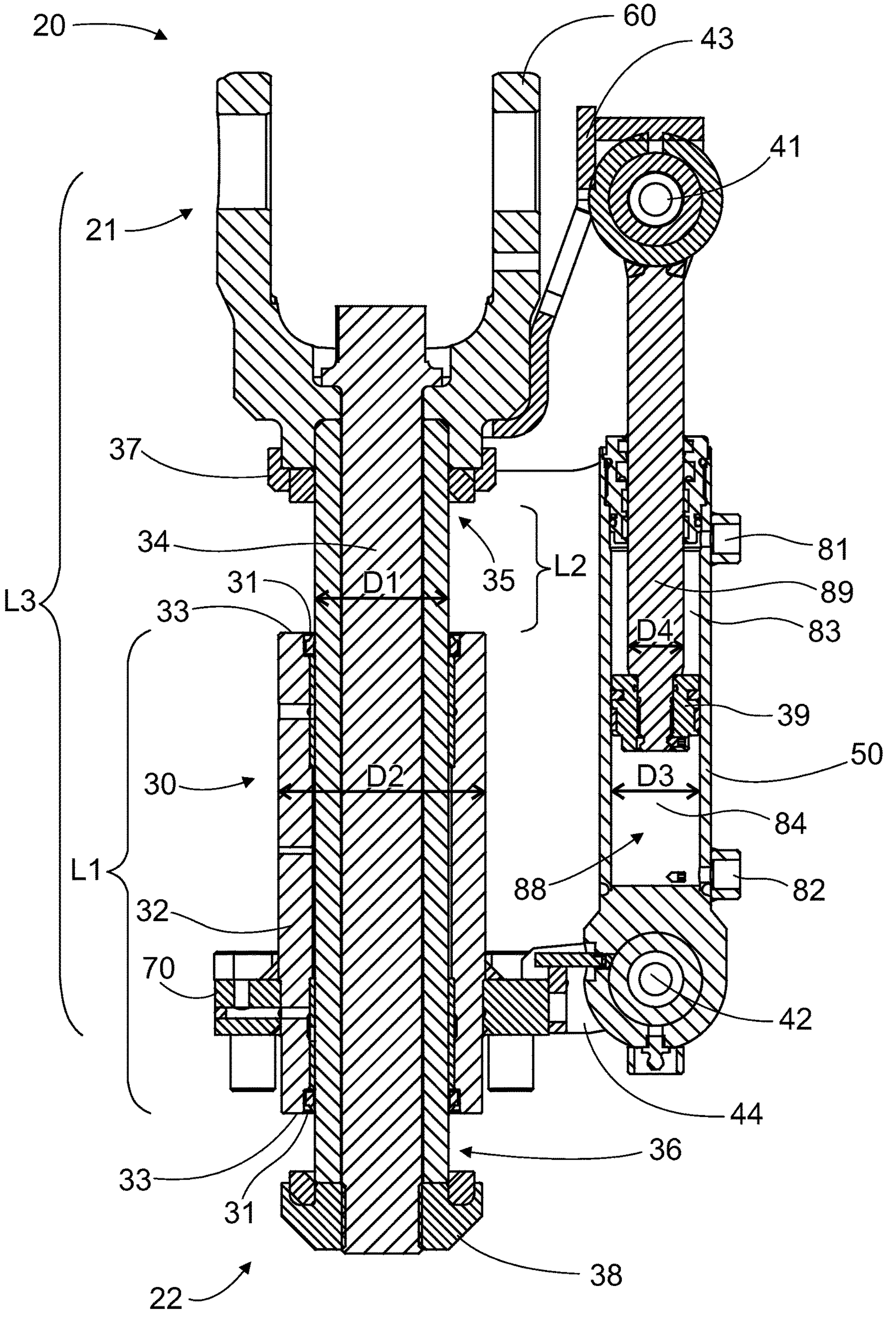
FIG. 11 is a cross-sectional view of a third embodiment of a suspension element according to the invention.

FIGS. 10 and 11 illustrate a third embodiment of the suspension element 20 according to the invention for a damping system of a cabin 12 of a work machine 10. In this embodiment, the damping element 50 is an active component, and a pressure accumulator, which is not shown in FIGS. 10 and 11, functions as the spring element 40. More precisely, in this embodiment, the damping element 50 comprises a hydraulic cylinder 88, within which a piston 39 located at the end of a piston rod 89 is placed. The piston rod 89 is mechanically bound to a first fixing end 41. The piston 39 limits a first chamber 83 and a second chamber 84, which contain hydraulic fluid, within the hydraulic cylinder 88. The hydraulic cylinder 88 also comprises a first hydraulic connection 81 connected to the first chamber 83 and a second hydraulic connection 82 connected to the second chamber 84, and the flow of the hydraulic fluid passing through these can be controlled with a computer.

The pressure accumulator is connected to the second hydraulic connection 82. When the first end 21 and the second end 22 of the suspension element 20 move closer to each other, i.e., when the cabin 12 moves downwards, the piston 39 of the damping element 50 moves downwards loading pressure to the pressure accumulator. The cabin 12 fastened to the first end 21 of the suspension element 20 returns to a balanced position as the pressure of the pressure accumulator is discharged thus lifting the piston 39. The throttle present in the hydraulic system functions as an active damper allowing adjustment of the throttle and thereby of the damping of the damping element 50 during operation.

The ROPS resistance of the suspension element 20 has been achieved with the structure of the slide guide 32 and the support arm 34. In this embodiment, the slide guide 32 is made of quenched and tempered steel MOC410 and the support arm 34 is made of quenched and tempered steel MOC210. The outer diameter D2 of the slide guide 32 is 100 mm. The diameter D1 of the support arm 34 is 70 mm, and the inner diameter of the slide guide 32 is naturally slightly larger than the diameter D1 of the support arm 34. The distance L1 between the points of support 33 of the slide guide 32 is 220 mm. In this embodiment, the vertical travel range of the suspension element 20 is 150 mm or, in other words, the distance L2 between the first stopper 37 and the point of support 33 of the slide guide 32 can be in the range of 0-150 mm during operation. The length of the suspension element 20, i.e., the distance L3 between the first fixing stopper 60 and the second fixing stopper 70, taking account of the travel range, can be in the range of 330-480 mm. The diameter D3 of the piston 39 of the hydraulic cylinder 88 of the damping element 50 is 32 mm and the diameter D4 of the piston rod 89 is 18 mm.

The embodiment according to FIGS. 10 and 11 can also function as a passive component without a computer control. In this case, this embodiment differs from the embodiment set forth in FIGS. 4 and 5 in that the spring element 40 comprises a hydraulic or pneumatic pressure accumulator instead of a coil spring. Hence, the throttle functioning as the damper can also be located in the piston 39, in which case the piston 39 has a small hole or holes, which function as a throttle. When the piston 39 moves, hydraulic fluid flows through the throttle of the piston 39 from the first chamber 83 to the second chamber 84 and vice versa, which tends to slow down the movement of the piston 39. Therefore, it can be said that the throttle functions as a shock absorber damping the oscillation movement of the spring element. Alternatively, the piston 39 can have two holes with one-way valves fitted therein in such a way that hydraulic fluid flows from the first chamber 83 to the second chamber 84 through the first hole of the piston 39 and hydraulic fluid flows from the second chamber 84 to the first chamber 83 through the second hole of the piston 39.

In addition to the embodiments set forth above, the suspension element 20 according to the invention can comprise any spring element 40 and damping element 50) placed at the side of the guide element 30.

The invention claimed is:

1. A damping system for a cabin of a movable work machine, wherein the cabin is supported to a frame of the work machine with suspension elements for damping oscillation motion, impacts and vibration, the suspension elements having a first end and a second end and forming a Roll Over Protection System (ROPS) resistance structure, and the suspension elements including, a first fixing stopper for fastening the cabin of the work machine to the first end of the suspension element, a second fixing stopper for fastening the frame of the work machine to the second end of the suspension element, a spring element, which is mechanically bound between the first end of the suspension element and the second end of the suspension element, a damping element, which is mechanically bound between the first end of the suspension element and the second end of the suspension element, characterised in that a travel range of the support arm is arranged to extend at least beyond the first fixing stopper or the second fixing stopper, and a guide element fitted outside the spring element and the damping element, wherein the suspension elements include the guide element comprising a linear motion slide guide including slide bearings for guiding movement of a support arm, the support arm being fitted in the linear motion slide guide, the linear motion slide guide and the support arm being arranged to move linearly relative to each other while resisting lateral loads, and the guide element having opposite ends, of which opposite ends one is in the linear motion slide guide and the other is in the support arm, and of which opposite ends one is mechanically bound to the first end of the suspension elements and the other is mechanically bound to the second end of the suspension elements.

2. The damping system according to claim 1, characterised in that said linear motion slide guide of the guide element is open at both of ends enabling movement of said support arm through the linear motion slide guide.

3. The damping system according to claim 2, characterised in that said support arm has a first end and a second end, which are always outside said linear motion slide guide in the movement direction.

4. The damping system according to claim 3, characterised in that a first stopper is placed at the first end and a second stopper at the second end of said support arm for restricting the movement of the support arm.

5. The damping system according to claim 1, characterised in that the linear motion slide guide is mechanically bound to the frame of the work machine and the support arm is mechanically bound to the cabin of the work machine.

6. The damping system according to claim 1, characterised in that, to provide ROPS resistance for the cabin of the work machine, the support arm is made of metal and a diameter (D1) of the support arm with a circular cross-section is about 50-100 mm.

7. The damping system according to claim 1, characterised in that, to provide ROPS resistance for the cabin of the work machine, the linear motion slide guide is made of metal, preferably steel, and a difference between an inner diameter and an outer diameter (D2) of the linear motion slide guide is about 20-50 mm and a distance (L1) between points of support at both ends of the linear motion slide guide is about 150-300 mm.

8. The damping system according to claim 1, characterised in that the support arm is essentially parallel to a line segment determined by a centre point of the first fixing stopper and a centre point of the second fixing stopper, and a centre point of the support arm is essentially on the line segment determined by the centre point of the first fixing stopper and the centre point of the second fixing stopper.

9. The damping system according to claim 1, characterised in that there is an empty space in the frame or in the cabin at the suspension element for movement of the support arm of the guide element.

10. The damping system according to claim 1, characterised in that the damping system comprises at least four suspension elements so that there is at least one suspension element in each corner of the cabin.

11. The damping system according to claim 1, characterised in that a distance between a first fastening end and a second fastening end of the damping element is longer than a distance between points of support of the linear motion slide guide.

12. The damping system according to claim 1, characterised in that a distance between a first fastening end and a second fastening end of the damping element is about 110-200% of a distance between points of support of the linear motion slide guide.

13. The damping system according to claim 1, characterised in that, between the cabin and the first fixing stopper of the suspension element, there is an elastic component for compensating for distance changes of the fixing stoppers due to movements of the support arms.

14. The damping system according to claim 1, characterised in that, placed within the guide element, around the support arm, there is a piston, which limits a first chamber and a second chamber within the guide element.

15. The damping system according to claim 14, characterised in that two suspension elements are cross-connected in such a way that a first hydraulic pipe connects the first chamber of the first suspension element and the second chamber of the second suspension element, and a second hydraulic pipe connects the second chamber of the first suspension element and the first chamber of the second suspension element, for forming hydraulic stability control.

16. The damping system according to claim 1, characterised in that the movable work machine is a forestry machine.

17. The damping system according to claim 1, characterised in that the spring element comprises a coil spring, which is fitted coaxially around the damping element.

18. The damping system according to claim 1, characterised in that the spring element comprises a hydraulic or pneumatic pressure accumulator.

19. The damping system according to claim 1, characterised in that a vertical travel range of the suspension element is arranged to about 100-200 mm.

20. A damping system for a cabin of a movable work machine, wherein the cabin is supported to a frame of the work machine with suspension elements for damping oscillation motion, impacts and vibration, the suspension elements having a first end and a second end and forming a Roll Over Protection System (ROPS) resistance structure, and the suspension elements including, a first fixing stopper for fastening the cabin of the work machine to the first end of the suspension element, a second fixing stopper for fastening the frame of the work machine to the second end of the suspension element, a spring element, which is mechanically bound between the first end of the suspension element and the second end of the suspension element, a damping element, which is mechanically bound between the first end of the suspension element and the second end of the suspension element, characterised in that a travel range of the support arm is arranged to extend at least beyond the first fixing stopper or the second fixing stopper, a guide element fitted outside the spring element and the damping element, wherein the suspension elements include the guide element comprising a slide guide and a support arm fitted in the slide guide, the slide guide and the support arm being arranged to move relative to each other, and the guide element having opposite ends, of which opposite ends one is in the slide guide and the other is in the support arm, and of which opposite ends one is mechanically bound to the first end of the suspension elements and the other is mechanically bound to the second end of the suspension elements, and a piston configured to limit a first chamber and a second chamber within the guide element, wherein two suspension elements are cross-connected in such a way that a first hydraulic pipe connects the first chamber of the first suspension element and the second chamber of the second suspension element, and a second hydraulic pipe connects the second chamber of the first suspension element and the first chamber of the second suspension element, for forming hydraulic stability control.

* * * * *